United States Patent
Kitamura et al.

(10) Patent No.: US 10,710,924 B2
(45) Date of Patent: Jul. 14, 2020

(54) OPTICAL FIBER PRODUCTION METHOD

(71) Applicant: FUJIKURA LTD., Tokyo (JP)

(72) Inventors: Takayuki Kitamura, Chiba (JP); Akihito Imase, Chiba (JP)

(73) Assignee: Fujikura Ltd., Tokyo (JP)

( * ) Notice: Subject to any disclaimer, the term of this patent is extended or adjusted under 35 U.S.C. 154(b) by 78 days.

(21) Appl. No.: 15/740,264

(22) PCT Filed: Sep. 20, 2016

(86) PCT No.: PCT/JP2016/077718
§ 371 (c)(1),
(2) Date: Dec. 27, 2017

(87) PCT Pub. No.: WO2017/073203
PCT Pub. Date: May 4, 2017

(65) Prior Publication Data
US 2018/0194666 A1 Jul. 12, 2018

(30) Foreign Application Priority Data

Oct. 29, 2015 (JP) .................................. 2015-213056

(51) Int. Cl.
*C03B 37/025* (2006.01)
*C03B 37/027* (2006.01)
(Continued)

(52) U.S. Cl.
CPC .... *C03B 37/0253* (2013.01); *C03B 37/02727* (2013.01); *C03B 37/032* (2013.01); *G02B 6/02* (2013.01)

(58) Field of Classification Search
CPC .................................................. C03B 23/047
See application file for complete search history.

(56) References Cited

U.S. PATENT DOCUMENTS

2003/0110811 A1* 6/2003 Nunome ........... C03B 37/01413
65/421
2010/0162759 A1 7/2010 Duran et al.
(Continued)

FOREIGN PATENT DOCUMENTS

JP H06-024775 A 2/1994
JP 2002-321936 A 11/2002
(Continued)

OTHER PUBLICATIONS

K. Saito, et al., "Control of Glass-Forming Process During Fiber-Drawing to Reduce the Rayleigh Scattering Loss", Journal of the American Ceramic Society, vol. 89, No. 1, Jan. 2006, pp. 65-69 (5 pages).
(Continued)

*Primary Examiner* — Cynthia Szewczyk
(74) *Attorney, Agent, or Firm* — Osha Liang LLP (57) ABSTRACT

An optical fiber production method includes: drawing an optical fiber from an optical fiber preform in a drawing furnace; cooling the optical fiber in an annealing furnace; and delivering the optical fiber into the annealing furnace, and controlling a temperature difference between a temperature of the optical fiber and a fictive temperature of glass forming a core included in the optical fiber to be higher than 20° C. and lower than 100° C.

12 Claims, 4 Drawing Sheets

(51) Int. Cl.
  *C03B 37/03*   (2006.01)
  *G02B 6/02*    (2006.01)

(56) References Cited

U.S. PATENT DOCUMENTS

| | | | |
|---|---|---|---|
| 2012/0321261 A1* | 12/2012 | Haruna | ............... C03B 37/0253 |
| | | | 385/123 |
| 2013/0148934 A1 | 6/2013 | Nakanishi et al. | |
| 2015/0251945 A1 | 9/2015 | Nakanishi et al. | |

FOREIGN PATENT DOCUMENTS

| | | |
|---|---|---|
| JP | 2006-058494 A | 3/2006 |
| JP | 2007-238354 A | 9/2007 |
| JP | 2010-155778 A | 7/2010 |
| JP | 2013-122502 A | 6/2013 |
| JP | 2014-062021 A | 4/2014 |

OTHER PUBLICATIONS

K. Saito, et. al., "Limit of the Rayleigh scattering loss in silica fiber", Applied Physics Letters, vol. 83, No. 25, Dec. 22, 2003, pp. 5175-5177 (3 pages).
Office Action issued in corresponding Japanese Patent Application No. 2015-213056 dated Apr. 4, 2017, with translation (6 pages).
Office Action issued in corresponding Japanese Patent Application No. 2015-213056 dated Sep. 5, 2017, with translation (6 pages).

* cited by examiner

OPTICAL FIBER PRODUCTION METHOD

TECHNICAL FIELD

The present invention relates to an optical fiber production method.

BACKGROUND

In optical fiber communication systems, in order to increase the reach and the rate of optical transmission, the optical signal-to-noise ratio has to be increased. Thus, a decrease in transmission losses in optical fibers is demanded. Nowadays, since an optical fiber production method is highly sophisticated transmission losses caused by impurities contained in optical fibers are closed to the lower limits. A remaining main cause of transmission losses is scattering losses in association with fluctuations in the structure or composition of glass forming optical fibers. This is inevitable, because optical fibers are formed of glass.

As a method of decreasing fluctuations in the structure of glass, a method is known to cool molten glass slowly. As a method of slowly cooling molten glass, an attempt is made to slowly cool an optical fiber drawn from a drawing furnace immediately. Specifically, it is investigated to decrease the cooling rate of the optical fiber that an optical fiber drawn from a drawing furnace is heated in an annealing furnace, or an optical fiber drawn from a drawing furnace is surrounded by a heat insulator immediately.

Patent Literature 1 below discloses a method of setting the temperature of a heating furnace (an annealing furnace) is ±100° C. or less of the target temperature found by a recurrence formula in 70% or more of a region from a position at which the outer diameter of a silica based optical fiber having a core and a cladding becomes smaller than 500% of the final outer diameter to a position at which the temperature of the optical fiber is 1,400° C. Since the temperature history of the optical fiber is controlled in this manner, the fictive temperature of glass forming the optical fiber is decreased to reduce transmission losses.

[PATENT LITERATURE 1] JP2014-62021 A

However, the technique disclosed in Patent Literature 1 above is required to repeat complex calculations in order to adjust the temperature of the optical fiber to an ideal temperature change found by the recurrence formula. The technique disclosed in Patent Literature 1 permits the temperature of the optical fiber to have a temperature shift of as large as ±50° C. to 100° C. with respect to the target temperature found by the recurrence formula. When the temperature shift of the optical fiber is permitted in such a large deviation, it is difficult to say that the temperature history is sufficiently optimized. For example, supposing that the temperature of the optical fiber slowly cooled is changed in a range of ±100° C. and the fictive temperature of glass forming the optical fiber is also changed in a similar range, transmission losses of the obtained optical fiber caused by light scattering fluctuate as large as about ±0.007 dB/km. In such the disclosed production methods in which the temperature history of the optical fiber is not sufficiently optimized, the annealing furnace is elongated more than necessary, resulting in excessive capital investment, or the drawing rate is decreased more than necessary, resulting in degraded productivity.

The present inventors found that the temperature difference between the fictive temperature of glass forming the optical fiber and the temperature of the optical fiber is controlled in a predetermined range in the slow cooling process, resulting in the promotion of the relaxation of the structure of glass forming the optical fiber and easily reducing transmission losses in the optical fiber.

SUMMARY

One or more embodiments of the present invention provide an optical fiber production method that easily reduces transmission losses in the optical fiber.

An optical fiber production method according to one or more embodiments of the present invention includes: a drawing process of drawing an optical fiber from an optical fiber preform in a drawing furnace; and a slow cooling process of slowly cooling the optical fiber drawn in the drawing process in an annealing furnace. In the method, when the optical fiber is delivered into the annealing furnace, a temperature difference between a temperature of the optical fiber and a fictive temperature of glass forming a core included in the optical fiber is higher than 20° C. and lower than 100° C.

As described above, in the slow cooling process according to one or more embodiments, the temperature difference between the temperature of the optical fiber and the fictive temperature of glass forming the core included in the optical fiber is controlled in a predetermined range, and hence the fictive temperature of glass forming the core is decreased for a shorter time. That is, the relaxation of the structure of glass forming the core is promoted in the slow cooling process for a shorter time. Consequently, scattering losses caused by fluctuations in the structure of glass forming the core in the transmission of light are reduced, and transmission losses in the optical fiber are reduced.

According to one or more embodiments, when the optical fiber is delivered into the annealing furnace, a temperature difference between a temperature of the optical fiber and a fictive temperature of glass forming the core is higher than 40° C. and lower than 60° C. As described above, the temperature of the optical fiber delivered into the annealing furnace is controlled in a more suitable range, and hence the effect of promoting the relaxation of the structure of glass forming the core included in the optical fiber is easily increased, and transmission losses in the optical fiber are easily reduced.

According to one or more embodiments, when a time constant of relaxation of a structure of glass forming the core is defined as $\tau(T)$, a temperature of the optical fiber at a certain point in time in the slow cooling process is defined as $T$, a fictive temperature of glass forming the core at the certain point in time is defined as $T_f^0$, and a fictive temperature of glass forming the core after a lapse of time $\Delta t$ from the certain point in time is defined as $T_f$, Equation (1) below is held.

$$20°\ \text{C.} < T_f - T = (T_f^{0-T})\exp(-\Delta t/\tau(T)) < 100°\ \text{C.} \tag{1}$$

The temperature difference ($T_f - T$) between the temperature $T$ of the optical fiber and the fictive temperature $T_f$ of glass forming the core included in the optical fiber is controlled in the predetermined range when the optical fiber is delivered into the annealing furnace as well as in a given period in which the optical fiber is delivered into and out of the annealing furnace, and hence the relaxation of the structure of glass forming the core included in the optical fiber is easily promoted, and transmission losses in the optical fiber are easily reduced.

Equation (2) below is held.

$$40°\ \text{C.} < T_f - T = (T_f^0 - T)\exp(-\Delta t/\tau(T)) < 60°\ \text{C.} \tag{2}$$

As described above, the temperature difference ($T_f$-T) between the temperature T of the optical fiber and the fictive temperature $T_f$ of glass forming the core included in the optical fiber is controlled in a more suitable range in a given period in the slow cooling process, and hence the relaxation of the structure of glass forming the core included in the optical fiber is more easily promoted, and transmission losses in the optical fiber are more easily reduced.

According to one or more embodiments, the optical fiber stays in the annealing furnace in at least a time in a period in which a temperature of the optical fiber is in a range of 1,300° C. to 1,500° C., both inclusive. The optical fiber is slowly cooled when the temperature of the optical fiber is in this range, and hence the fictive temperature of glass forming the core included in the optical fiber is easily decreased for a shorter time, and transmission losses in the optical fiber are easily reduced.

As described above, according to one or more embodiments of the present invention, an optical fiber production method that easily reduces transmission losses in the optical fiber is provided.

DETAILED DESCRIPTION OF THE INVENTION

In the following, embodiments of an optical fiber production method according to the present invention will be described in detail with reference to the drawings.

Figure 1:
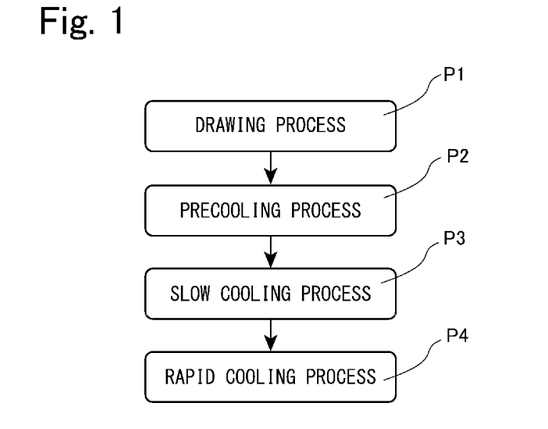
FIG. 1 is a flowchart of the processes of an optical fiber production method according to one or more embodiments of the present invention.
Figure 2:
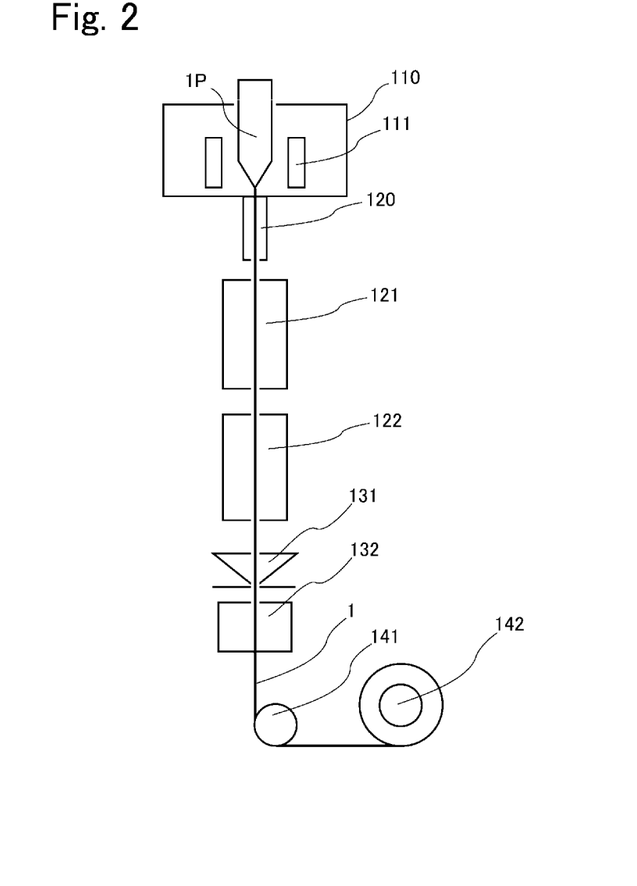
FIG. 2 is a schematic diagram of the configuration of devices for use in an optical fiber production method according to one or more embodiments of the present invention.

FIG. 1 is a flowchart of the processes of an optical fiber production method according to one or more embodiments of the present invention. As illustrated in FIG. 1, the optical fiber production method according to one or more embodiments includes a drawing process P1, a precooling process P2, a slow cooling process P3, and a rapid cooling process P4. In the following, these processes will be described. Note that, FIG. 2 is a schematic diagram of the configuration of devices for use in the optical fiber production method according to one or more embodiments.

<Drawing Process P1>

The drawing process P1 is a process in which one end of an optical fiber preform 1P is drawn in a drawing furnace 110. First, the optical fiber preform 1P is prepared. The optical fiber preform 1P is formed of glass having refractive index profiles the same as the refractive index profiles of a core and a cladding forming an optical fiber 1. The optical fiber 1 includes one or a plurality of cores and a cladding surrounding the outer circumferential surface of the core with no gap. The core and the cladding are formed of silica glass. The refractive index of the core is higher than the refractive index of the cladding. For example, in the case in which the core is formed of silica glass doped with a dopant, such as germanium, which increases the refractive index, the cladding is formed of pure silica glass. For example, in the case in which the core is formed of pure silica glass, the cladding is formed of silica glass doped with a dopant, such as fluorine, which decreases the refractive index.

Subsequently, the optical fiber preform 1P is suspended so that the longitudinal direction is perpendicular. The optical fiber preform 1P is disposed in the drawing furnace 110, a heating unit 111 is caused to generate heat, and then the lower end portion of the optical fiber preform 1P is heated. At this time, the lower end portion of the optical fiber preform 1P is heated at a temperature of 2,000° C., for example, to be molten. From the heated lower end portion of the optical fiber preform 1P, molten glass is drawn out of the drawing furnace 110 at a predetermined drawing rate.

<Precooling Process P2>

The precooling process P2 is a process in which the optical fiber drawn out of the drawing furnace 110 in the drawing process P1 is cooled to a predetermined temperature suitable for delivering the optical fiber into an annealing furnace 121, described later. A predetermined temperature of the optical fiber suitable for delivering the optical fiber into the annealing furnace 121 will be described later in detail.

In the optical fiber production method according to one or more embodiments, the precooling process P2 is performed by passing the optical fiber drawn in the drawing process P1 through the hollow portion of a tubular body 120 provided directly below the drawing furnace 110. The tubular body 120 is provided directly below the drawing furnace 110, causing the atmosphere in the inside of the hollow portion of the tubular body 120 to be almost the same as the atmosphere in the inside of the drawing furnace 110. Thus, a sudden change in the atmosphere and the temperature around the optical fiber immediately after drawn is reduced.

The temperature of the optical fiber delivered into the annealing furnace 121 is mainly determined by the drawing rate and the atmosphere inside the drawing furnace 110. The precooling process P2 is provided, which further finely adjusts the cooling rate of the optical fiber for easy adjustment of the incoming temperature of the optical fiber to be delivered into the annealing furnace 121 to a suitable range. Based on the temperature of the optical fiber to be drawn out of the drawing furnace 110 and the temperature of the optical fiber suitable for delivering the optical fiber into the annealing furnace 121, the distance from the annealing furnace 121 to the drawing furnace 110 and the length of the tubular body 120 can be appropriately selected. The tubular body 120 is formed of a metal tube, for example. The cooling rate of the optical fiber may be adjusted by air-cooling the metal tube or by providing a heat insulator around the metal tube.

<Slow Cooling Process P3>

The slow cooling process P3 is a process in which the optical fiber, which is drawn out of the drawing furnace 110 in the drawing process P1 and whose temperature is adjusted to a predetermined temperature in the precooling process P2, is slowly cooled in the annealing furnace 121. The temperature in the inside of the annealing furnace 121 is adjusted to a predetermined temperature different from the temperature of the optical fiber to be delivered into the annealing furnace 121, and the cooling rate of the optical fiber is decreased by the temperature around the optical fiber delivered into the annealing furnace 121. Because the cooling rate of the optical fiber is decreased in the annealing furnace 121, the structure of glass forming the core included in the optical fiber is relaxed, and the optical fiber 1 with decreased scattering losses is obtained, as described below.

In the disclosed optical fiber production methods having slow cooling process, the temperature of the optical fiber is not sufficiently optimized when the optical fiber is delivered into the annealing furnace. Specifically, the optical fiber is sometimes delivered into the annealing furnace with the temperature of the optical fiber being too high or too low. When the temperature of the optical fiber to be delivered into the annealing furnace is too high, the rate to relax the structure of glass forming the optical fiber is too fast, hardly expecting the effect of slowly cooling the optical fiber. On the other hand, when the temperature of the optical fiber to be delivered into the annealing furnace is too low, the rate to relax the structure of glass forming the optical fiber is decreased, sometimes causing a necessity to heat up again the optical fiber in the annealing furnace, for example. As described above, in the disclosed slow cooling processes, it is difficult to say that the relaxation of the structure of glass forming the optical fiber is efficiently performed. Thus, the annealing furnace is elongated more than necessary, which might demand an excessive capital investment, or the drawing rate is decreased more than necessary, which might degrade productivity.

According to the optical fiber production method of one or more embodiments, the temperature of the optical fiber is controlled in a suitable range in the slow cooling process P3 as describe below. Thus, the relaxation of the structure of glass forming the core included in the optical fiber is promoted. As a result, the optical fiber 1 having decreased transmission losses can be obtained with no requirement of excessive capital investment and with excellent productivity. According to the optical fiber production method of one or more embodiments, complex calculation is not necessary unlike the technique disclosed in Patent Literature 1 described above.

In silica glass classified as so-called strong glass, the time constant τ(T) of the structural relaxation, which is thought to correspond to the viscosity flow of glass, follows the Arrhenius equation. Thus, the time constant τ(T) is expressed as Equation (3) as a function of the temperature T of glass using a constant A and an activation energy $E_{act}$ determined by the composition of glass. Note that, $k_B$ is Boltzmann constant.

$$1/\tau(T) = A \cdot \exp(-E_{act}/k_B T) \quad (3)$$

(Here, T is absolute temperature of glass.)

Equation (3) above shows that the structure of glass is relaxed faster as the temperature of glass is higher and reached faster in the equilibrium state at the given temperature. That is, the fictive temperature of glass comes close to the temperature of glass faster as the temperature of glass is higher.

Figure 3:
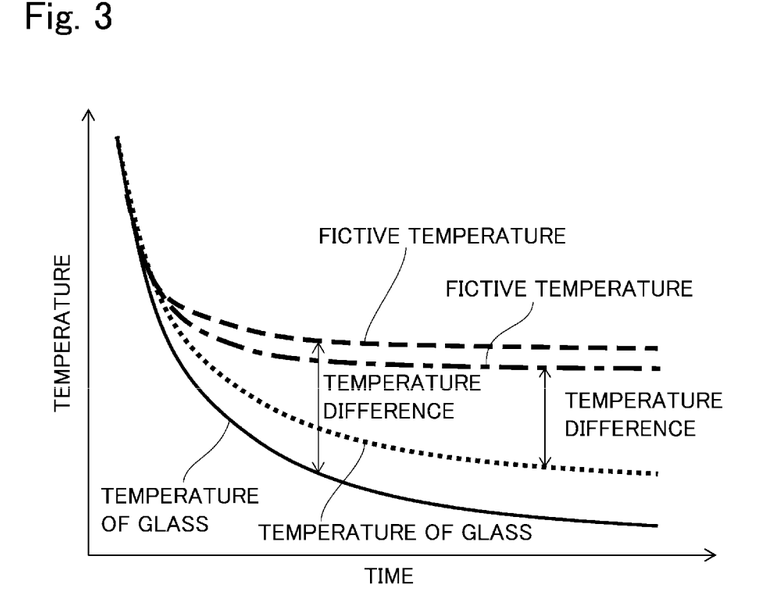
FIG. 3 is a graph of the relationship of the temperature of glass and the fictive temperature of the glass with slow cooling time.

FIG. 3 shows the relationship of the temperature of glass and the fictive temperature of the glass with time in slowly cooling glass. In the graph of FIG. 3, the horizontal axis expresses time, and the vertical axis expresses temperature. In FIG. 3, a solid line expresses the transition of the temperature of glass under certain slow cooling conditions, and a broken line expresses the transition of the fictive temperature of glass at that time. A dotted line expresses the transition of the temperature of glass in the case in which the cooling rate is decreased more slowly than the slow cooling conditions expressed by the solid line, and an alternate long and short dash line expresses the transition of the fictive temperature of glass at that time.

As expressed by the solid line and the broken line in FIG. 3, when the temperature of glass is decreased over a lapse of time in the high temperature area, the fictive temperature of glass is also similarly decreased. As described above, in the state in which the temperature of glass is sufficiently high, the rate of the relaxation of the structure of glass forming the optical fiber is very fast. However, as the temperature of glass is decreased, the rate of the relaxation of the structure of glass is decreased, and the fictive temperature of glass fails to follow a decrease in the temperature of glass after a while. The temperature difference between the temperature of glass and the fictive temperature of glass is increased. Here, when the cooling rate of glass is slowed, the optical fiber is held in a relatively higher temperature state for a longer time, compared with the case in which the cooling rate is fast. Thus, as expressed by the dotted line and the alternate long and short dash line in FIG. 3, even though the temperature of glass is decreased, the temperature difference between the temperature of glass and the fictive temperature of glass becomes smaller, and the fictive temperature of glass is lower than the example described above. That is, when the cooling rate of glass is slowed, the relaxation of the structure of glass is easily promoted.

As described above, when the temperature of glass is high, the structure of glass is relaxed fast. However, the fictive temperature of glass does not reach to the below of the temperature of glass. Thus, when the temperature of glass is high, the fictive temperature of the glass also remains high. That is, when the temperature of glass is too high, the effects obtained by slow cooling are poor. From this viewpoint, the temperature of the optical fiber staying in the annealing furnace 121 is 1,600° C. or less, or 1,500° C. or less. On the other hand, in the case in which the temperature of glass is low, the fictive temperature can be decreased to a lower temperature, but the decrease rate of the fictive temperature is slowed. That is, when the temperature of glass is too low, it will take longer time for slow cooling in order to sufficiently decrease the fictive temperature. From this viewpoint, the temperature of the optical fiber staying in the annealing furnace 121 is 1,300° C. or more, or 1,400° C. or more. Therefore, the optical fiber stays in the annealing furnace 121 at least a time in a period in which the temperature of the optical fiber is in a range of 1,300° C. to 1,500° C., both inclusive. As described above, in the slow cooling process P3, the optical fiber is slowly cooled when the temperature of the optical fiber is in a predetermined range. Thus, the fictive temperature of glass forming the core included in the optical fiber is easily decreased for a shorter time, and transmission losses in the optical fiber are easily reduced.

Next, the following is the description in which the relaxation of the structure of glass forming the core is efficiently promoted to reduce transmission losses in the optical fiber by what manner of slowly cooling the optical fiber by means of the relationship between the temperature of glass and the fictive temperature of glass.

Under the conditions in which the time constant of the relaxation of the structure of glass forming the core included in the optical fiber is defined as τ(T), the temperature of the optical fiber at a certain point in time in the slow cooling process P3 is defined as T, and the fictive temperature of glass forming the core at that certain point in time is defined as $T_f^o$, the fictive temperature $T_f$ of glass forming the core after a lapse of time Δt from the certain point in time is expressed as Equation (4) below based on Equation (3) above. Note that, Δt is a short period of time, and the temperature of the optical fiber T for this period is supposed to be constant.

$$T_f - T = (T_f^o - T)\exp(-\Delta t / \tau(T)) \quad (4)$$

Equation (4) above shows that the temperature difference ($T_f$-T) between the fictive temperature $T_f$ of glass forming the core and the temperature T of the optical fiber depends on the temperature difference ($T_f^o$-T) between the fictive temperature $T_f^o$ of glass forming the core and the temperature T of the optical fiber at a certain point in time as well as the fictive temperature $T_f$ of glass forming the core depends on the time constant τ(T) of the relaxation of the structure. The time constant τ(T) of the relaxation of the structure is defined as time until the temperature difference ($T_f$-T) between the fictive temperature $T_f$ of glass and the temperature T of glass reaches 1/e when the temperature of glass whose fictive temperature is $T_f^o$ is T. A change in the fictive temperature $T_f$ per unit time is greater as the temperature difference ($T_f^o$-T) is great to some extent.

Figure 4:
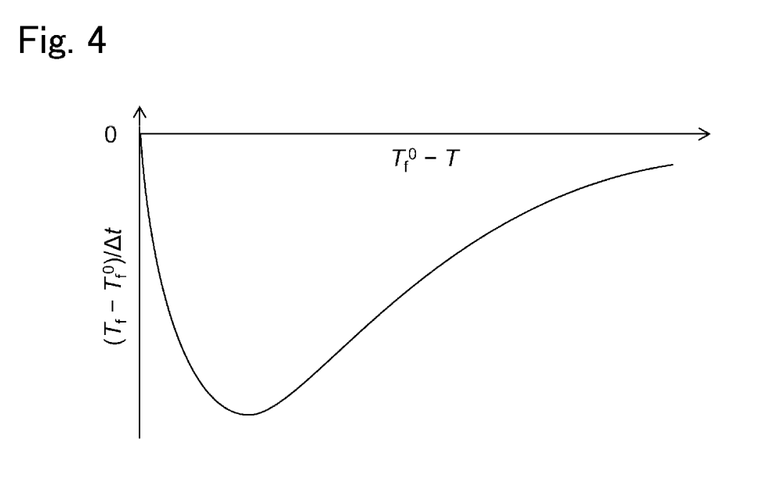
FIG. 4 is a graph of the relationship of the temperature difference ($T_f^o$-T) between the fictive temperature of glass and the temperature of glass with the decrease rate (($T_f$-$T_f^o$)/Δt) of the fictive temperature of glass per unit time.

FIG. 4 schematically shows the relationship between the temperature difference ($T_f^o$-T) where the temperature of the optical fiber including the core formed of glass whose fictive temperature is $T_f^o$ is T and a change (($T_f$-$T_f^o$)/Δt) in the fictive temperature $T_f$ per unit time. As shown in FIG. 4, under the conditions in which the fictive temperature $T_f^o$ of glass forming the core coincides with the temperature T of the optical fiber ($T_f^o$=T), the relaxation of the structure of glass forming the core does not occur, and a change in the fictive temperature per unit time is zero (($T_f$-$T_f^o$)/Δt=0). The conditions are thought in which the temperature T of the optical fiber is decreased from this point and the temperature difference ($T_f^o$-T) between the fictive temperature $T_f^o$ of glass forming the core and the temperature T of the optical fiber is increased. Under the conditions, although the time constant τ(T) of the relaxation of the structure of glass forming the core is increased, the change rate of the fictive temperature $T_f$ per unit time (($T_f$-$T_f^o$)/Δt) is negatively increased. However, the conditions are thought in which the temperature T of the optical fiber is further decreased and the temperature difference ($T_f^o$-T) between the fictive temperature $T_f^o$ of glass forming the core and the temperature T of the optical fiber is further increased. Under the conditions, the time constant τ(T) of the relaxation of the structure of glass forming the core is now gradually increased, and the absolute value of a change in the fictive temperature $T_f$ per unit time (($T_f$-$T_f^o$)/Δt) is decreased. That is, FIG. 4 shows that as a peak expressed in the graph, a change in the fictive temperature per unit time (($T_f$-$T_f^o$)/Δt) takes a minimum value when the temperature difference ($T_f^o$-T) between the fictive temperature $T_f^o$ of glass forming the core and the temperature T of the optical fiber is at a certain value.

Here, solving Equation (4) above shows that the relationship of Equation (5) below is held between the temperature T of glass and the fictive temperature $T_f$ when the decrease rate of the fictive temperature $T_f$ of glass is the maximum.

$$T^2 + (E_{act}/k_B) \times T - (E_{act}/k_B) \times T_f = 0 \quad (5)$$

When Equation (5) above is further solved on T as Equation (6) below, the temperature T of glass can be found, at which the fictive temperature $T_f$ of glass can be most efficiently decreased. In the following, the temperature of glass, at which the fictive temperature $T_f$ of glass can be most efficiently decreased, is sometimes referred to as "the optimized temperature of glass", and the fictive temperature that has been most efficiently decreased is sometimes referred to as "the optimized fictive temperature".

$$T = \frac{-\frac{E_{act}}{k_B} + \sqrt{\left(\frac{E_{act}}{k_B}\right)^2 + 4\frac{E_{act}}{k_B}T_f}}{2} \quad (6)$$

As described so far, when the temperature difference ($T_f^o$-T) between the fictive temperature $T_f^o$ of glass and the temperature T of glass at a certain point in time is a predetermined value, a change in the fictive temperature $T_f$ of glass per unit time is maximized. That is, when the fictive temperature $T_f$ after a lapse of a certain time Δt of glass having the fictive temperature $T_f^o$ is thought, the temperature T of glass is present at which fictive temperature $T_f$ can be minimum value.

Figure 5:
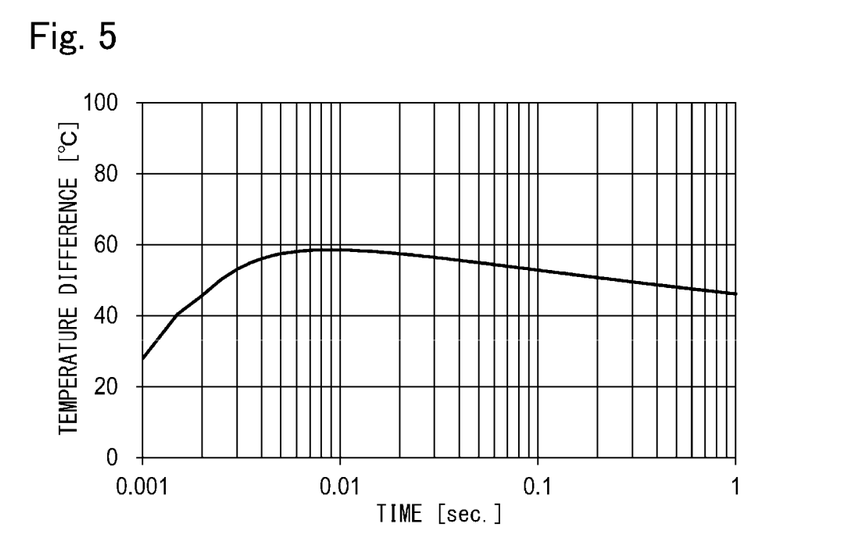
FIG. 5 is a graph of a temporal change in the temperature difference between the fictive temperature of glass and the temperature of glass.

FIG. 5 shows, on a standard single-mode optical fiber having a core doped with $G_eO_2$, a variation over time of the temperature difference ($T_f$-T) between the value where the fictive temperature $T_f$ of glass forming the core, which is found from Equation (4) above, takes the lowest value and the temperature T of the optical fiber at that value. Here, for the constant A and the activation energy $E_{act}$, values described in Non-Patent Literature 1 are used (K. Saito, et al., Journal of the American Ceramic Society, Vol. 89, pp. 65-69 (2006)). In the graph shown in FIG. 5, the vertical axis expresses the temperature difference ($T_f$-T) between the value where the fictive temperature $T_f$ of glass forming the core takes the lowest value and the temperature T of the optical fiber at that value, and the horizontal axis expresses the slow cooling time of the optical fiber. Here, supposing that a temperature $T^o$ of the optical fiber is 1,900° C. at the beginning of slow cooling, at which slow cooling time is zero second, time required for relaxing the structure of glass forming the core at this temperature is as very short as less than 0.0001 second. Thus, it can be thought that the fictive temperature $T_f^o$ of glass forming the core at the beginning of slow cooling is also a temperature of 1,900° C. That is, the initial value is assumed as $T_f^o$-$T^o$=0° C.

In a variation over time of the temperature difference ($T_f$-T) derived from the assumption, the temperature difference ($T_f$-T) is suddenly increased in a time domain up to about 0.01 second. This shows that since the temperature of the optical fiber is high and the temperature difference ($T_f$-T) is small, it is necessary to decrease the fictive temperature $T_f$ of glass forming the core by quickly cooling the optical fiber to increase the temperature difference ($T_f$-T). On the other hand, it is shown that in a time domain after about 0.01 second, the temperature difference ($T_f$-T) is gradually decreased and the temperature T of the optical fiber is maintained in a range suitable for a decrease in the fictive temperature $T_f$ of glass forming the core. Under these conditions, the fictive temperature of glass forming the core where slow cooling time is 0.5 second is found as 1,390° C.

Since the maximum value of the temperature difference ($T_f$-T) between the fictive temperature $T_f$ and the temperature of the optical fiber shown in FIG. 5 is about 60° C., initial values are assumed where $T_f^o$-$T^o$=60° C. for further investigation. That is, initial values are assumed where the temperature $T^o$ of the optical fiber at the beginning of slow cooling, at which slow cooling time is zero second, is 1,540°

Figure 6:
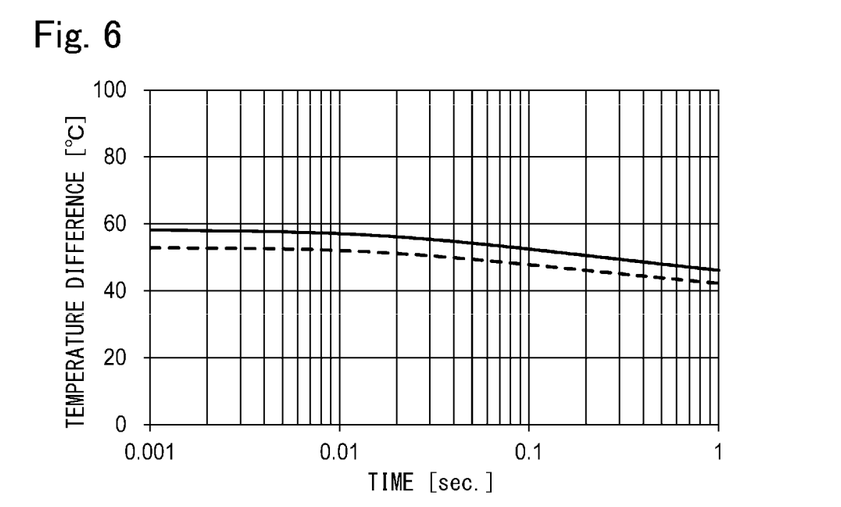
FIG. 6 is a graph of a temporal change in the temperature difference between the fictive temperature of glass and the temperature of glass under the conditions different from the conditions in FIG. 5.

C., and the fictive temperature $T_f^0$ of glass forming the core at this time is 1,600° C. Similarly to the result shown in FIG. 5, the solid line in FIG. 6 shows a variation over time of the temperature difference ($T_f$-T) between the value where the fictive temperature $T_f$ of glass forming the core takes the lowest value and the temperature T of the optical fiber at that value. In the graph in FIG. 6, the vertical axis expresses the temperature difference ($T_f$-T) between the value where the fictive temperature $T_f$ of glass forming the core takes the lowest value and the temperature T of the optical fiber at that value, and the horizontal axis expresses the slow cooling time of the optical fiber. The solid line in FIG. shows that the temperature difference ($T_f$-T) is monotonously decreased in all the time domains and the temperature T of the optical fiber is maintained in a range suitable for a decrease in the fictive temperature $T_f$ of glass forming the core. Under these conditions, the fictive temperature of glass forming the core where slow cooling time is 0.5 second is derived as 1,388° C. Thus, it is revealed that the fictive temperature of glass forming the core is decreased more than the fictive temperature under the conditions shown in FIG. 5.

The investigation that derives the result shown in FIG. 5 was similarly performed using the constant A and the activation energy $E_{act}$ described in Non-Patent Literature 2 (K. Saito, et al., Applied Physics Letters, Vol. 83, pp. 5175-5177 (2003)). This derives the maximum value of the temperature difference ($T_f$-T) between the fictive temperature $T_f$ and the temperature of the optical fiber, which is about 55° C. The initial values where $T_f^0$-$T^0$=55° C. are assumed for further investigation. FIG. 6 shows, by a broken line, the case in which the temperature $T^0$ of the optical fiber is 1,485° C. at the beginning of slow cooling, at which slow cooling time is zero second, and the fictive temperature $T_f^0$ of glass forming the core at this time is 1,540° C., and $T_f$-T=55° C. Also under the conditions shown by the broken line, it is revealed that the temperature difference ($T_f$-T) is (kept) monotonously decreased in all the time domains, and the temperature T of the optical fiber is maintained in a range suitable for a decrease in the fictive temperature $T_f$ of glass forming the core. Under these conditions, the fictive temperature of glass forming the core where slow cooling time is 0.5 second is derived as 1,321° C.

The results shown in FIG. 6 reveal the following. That is, even though slight differences are present in the values of the constant A and the activation energy $E_{act}$ determined based on the composition, it is revealed that when the temperature difference ($T_f$-T) between the fictive temperature $T_f$ of glass and the temperature T of glass is in a predetermined range, the fictive temperature $T_f$ of glass is efficiently decreased. Thus, in so-called typical optical fibers in which the concentration of dopant is low and its principal component is silica glass, the optical fiber is delivered into the annealing furnace 121 when the temperature difference ($T_f$-T) between the fictive temperature $T_f$ of glass forming the core and the temperature T of the optical fiber is in a predetermined range, and hence the fictive temperature $T_f$ of glass forming the core is efficiently decreased. For example, also in cores made of silica glass doped with a dopant, such as $G_eO_2$, and claddings substantially made of pure silica glass, the fictive temperature is efficiently decreased.

Note that, from the viewpoint of energy savings in production of the optical fiber, the temperature of the optical fiber is monotonously decreased with no temperature rise after the optical fiber heated and molten in the drawing furnace 110. In this case, the temperature of the optical fiber when delivered into the annealing furnace 121 is the highest temperature in a period in which the optical fiber stays in the annealing furnace 121. That is, the rate of the relaxation of the structure of glass forming the core in the annealing furnace 121 is the fastest when the optical fiber is delivered into the annealing furnace 121. Thus, the temperature of the optical fiber when delivered into the annealing furnace 121 greatly affects the relaxation of the structure of glass forming the core in the slow cooling process P3. Therefore, it is specifically important to appropriately adjust the temperature of the optical fiber when delivered into the annealing furnace 121.

From the description above, it is revealed that when the optical fiber is delivered into the annealing furnace 121, the temperature difference ($T_f$-T) between the temperature of the optical fiber and the fictive temperature of glass forming the core included in the optical fiber is about 55° C. to 60° C. However, some errors occur in the optimum value of this temperature difference ($T_f$-T) depending on the composition of glass. Therefore, when the optical fiber is delivered into the annealing furnace 121, the temperature difference between the temperature of the optical fiber and the fictive temperature of glass forming the core included in the optical fiber is higher than 40° C. and lower than 60° C. The temperature of the optical fiber and the fictive temperature of glass forming the core included in the optical fiber are controlled in predetermined ranges in the slow cooling process P3 in this manner, and hence the fictive temperature of glass forming the core is decreased for a shorter time. That is, the relaxation of the structure of glass forming the core is promoted in the annealing furnace for a shorter time. Consequently, scattering losses during the transmission of the light in the core caused by fluctuations in the structure of glass forming the core are reduced, and transmission losses in the optical fiber are reduced. The lower limit of the temperature difference ($T_f$-T) between the temperature of the optical fiber and the fictive temperature of glass forming the core included in the optical fiber when delivered into the annealing furnace 121 is 45° C. or more, 50° C. or more, or 55° C. or more. As described above, the temperature of the optical fiber delivered into the annealing furnace is controlled in a more suitable range, and hence the relaxation of the structure of glass forming the core included in the optical fiber is easily promoted, and transmission losses in the optical fiber are easily reduced.

The temperature difference ($T_f$-T) between the temperature T of the optical fiber and the fictive temperature $T_f$ of glass forming the core included in the optical fiber is controlled in the predetermined range in a period in which the optical fiber is delivered into and out of the annealing furnace 121, i.e. in a given period in which the slow cooling process P3 is started and ended, as well as when the optical fiber is delivered into the annealing furnace 121, and hence the relaxation of the structure of glass forming the core included in the optical fiber is easily promoted, and transmission losses in the optical fiber are easily reduced. That is, when the time constant of the relaxation of the structure of glass forming the core is defined as $\tau(T)$, the temperature of the optical fiber at a certain point in time in the slow cooling process P3 is defined as T, and the fictive temperature of glass forming the core at that certain point in time is defined as $T_f^0$, and the fictive temperature of glass forming the core after a lapse of time $\Delta t$ from the certain point in time is defined as $T_f$, Equation (2) below is held.

$$40°\ C. < T_f - T = (T_f^0 - T)\exp(-\Delta t/\tau(T)) < 60°\ C. \quad (2)$$

As described above, in the slow cooling process P3, the temperature difference ($T_f$-T) between the temperature T of the optical fiber and the fictive temperature $T_f$ of glass forming the core included in the optical fiber is maintained in a predetermined range, and hence the relaxation of the structure of glass forming the core included in the optical fiber is more easily promoted. Therefore, transmission losses in the optical fiber are more easily reduced.

Note that, the conditions for the temperature difference ($T_f$-T) between the temperature T of the optical fiber and the fictive temperature $T_f$ of glass forming the core included in the optical fiber in order to most efficiently decrease the fictive temperature $T_f$ of glass forming the core are as described above. However, transmission losses in the optical fiber can also be sufficiently reduced under the conditions described below.

The fictive temperature $T_f$ of glass forming the core included in the optical fiber can be correlated to transmission losses in the optical fiber by a relational expression below. A Rayleigh scattering coefficient $R_r$ is proportional to the fictive temperature $T_f$ of glass forming the core, and a transmission loss $\alpha_T$ caused by Rayleigh scattering is expressed by Equation (7) below where the wavelength of light to be transmitted is $\lambda$ (μm).

$$\alpha_T = R_r/\lambda^4 = BT_f/\lambda^4 \qquad (7)$$

Here, based on Non-Patent Literature 2 (K. Saito, et al., Applied Physics Letters, Vol. 83, pp. 5175-5177 (2003)), $B=4.0\times10^{-4}$ dB/km/μm$^4$/K. Let us consider a transmission loss at the wavelength $\lambda=1.55$ μm. When the fictive temperature $T_f$ of glass forming the core is increased by 14° C., the Rayleigh transmission loss $\alpha_T$ caused by Rayleigh scattering is increased by about 0.001 dB/km. That is, when errors caused by the fictive temperature $T_f$ of glass forming the core, at which the fictive temperature $T_f$ is most efficiently decreased, can be controlled to below 14° C., an increase in the Rayleigh transmission loss $\alpha_T$ caused by Rayleigh scattering can be controlled to below 0.001 dB/km.

As described above, in the case of taking into account of permissive errors based on the fictive temperature $T_f$ of glass forming the core, at which the fictive temperature $T_f$ is most efficiently decreased, the optical fiber only has to be delivered into the annealing furnace 121 under the temperature conditions in which the temperature difference ($T_f$-T) between the fictive temperature $T_f$ of glass forming the core and the temperature of the optical fiber is higher than 20° C. and lower than 100° C. as described below.

Figure 7:
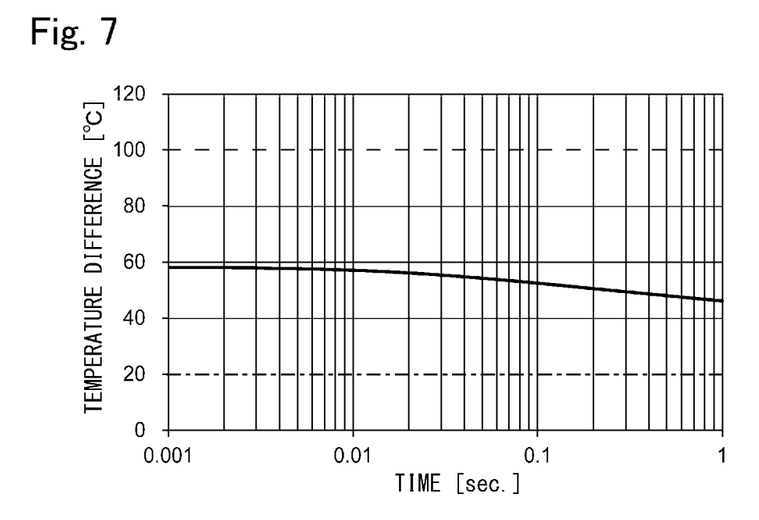
FIG. 7 is a graph of the optimized temperature difference ($T_f$-T) expressed by a solid line in FIG. 6 and the upper limit and the lower limit of a variation over time of the temperature difference ($T_f$-T) where the transmission loss caused by scattering is not increased by 0.001 dB/km or more.

To the transmission loss predicted from the fictive temperature $T_f$ of glass forming the core through the slow cooling process at the optimized temperature difference ($T_f$-T) expressed by the solid line in FIG. 6 for 0.5 second, the temperature difference, at which an increase in a transmission loss caused by scattering is controlled to below 0.001 dB/km, can be predicted from Recurrence Formula (4) above. When Recurrence Formula (4) is solved under the assumption in which the fictive temperature $T_f^0$ of glass forming the core of the optical fiber at the beginning of slow cooling, at which slow cooling time is zero second, is 1,540° C. and the temperature difference ($T_f$-T) is almost constant in the slow cooling process P3, a graph shown in FIG. 7 is obtained. In FIG. 7, the optimized temperature difference ($T_f$-T) expressed by the solid line in FIG. 6 is again expressed by a solid line. FIG. 7 shows the upper limit expressed by a broken line and the lower limit expressed by an alternate long and short dash line of a variation over time of the temperature difference ($T_f$-T) at which the transmission loss caused by scattering is not increased by 0.001 dB/km or more. Here, for the constant A and the activation energy $E_{act}$, the values described in Non-Patent Literature 1 (K. Saito, et al., Journal of the American Ceramic Society, Vol. 89, pp. 65-69 (2006)) are used. The result shown in FIG. 7 reveals that when the temperature of the annealing furnace 121 is set to control the temperature history of the optical fiber in which the temperature difference ($T_f$-T) is in a range of above 20° C. and below 100° C. during the slow cooling process P3, the fictive temperature of glass forming the core is controlled in a range in which the fictive temperature is not increased by about 14° C. or more to the fictive temperature $T_f$ of glass forming the core at which the fictive temperature $T_f$ is most efficiently decreased. Thus, when the optical fiber is delivered into the annealing furnace 121 under the temperature conditions in which the temperature difference ($T_f$-T) between the fictive temperature $T_f$ of glass forming the core and the temperature of the optical fiber is higher than 20° C. and lower than 100° C., an increase in the transmission loss can be controlled to an increase of 0.001 dB/km or less to the value under the optimized conditions in which the fictive temperature is most decreased.

Thus, the temperature difference ($T_f$-T) between the temperature T of the optical fiber and the fictive temperature $T_f$ of glass forming the core included in the optical fiber is maintained in a range of above 20° C. and below 100° C. in a period in which the optical fiber is delivered into and out of the annealing furnace 121, i.e. in a given period in which the slow cooling process P3 is started and ended as well as when the optical fiber is delivered into the annealing furnace 121, and hence the relaxation of the structure of glass forming the core included in the optical fiber is easily promoted, and transmission losses in the optical fiber are easily reduced. That is, Equation (1) below is held.

$$20°\ C. < T_f - T = (T_f^0 - T)\exp(-\Delta t/\tau(T)) < 100°\ C. \qquad (1)$$

Note that, the relationship between the fictive temperature $T_f$ of glass forming the core, at which the fictive temperature $T_f$ is most efficiently decreased, and the temperature T of the optical fiber depends only on the slow cooling time t. The slow cooling time t, the length L of the annealing furnace, and the drawing rate v can be correlated to each other by the relationship of Equation (8) below.

$$t = L/v \qquad (8)$$

Therefore, when the targeted fictive temperature $T_f$ of glass forming the core included in the optical fiber to be produced is set and the drawing rate v taking into account of productivity is determined, a necessary length L of the annealing furnace is derived. For example, the slow cooling time t needs about 0.1 second to set the fictive temperature $T_f$ to 1,500° C. Thus, it is revealed that when the drawing rate v is set to 20 m/second, the length L of the annealing furnace needs two meters. The slow cooling time t needs about 0.4 second in order to set the fictive temperature $T_f$ to 1,400° C., for example, and hence it is revealed that when the drawing rate v is set to 10 m/second, the length L of the annealing furnace needs four meters. On the other hand, the length L of the annealing furnace has only two meters, it is revealed that it is necessary to set the drawing rate v to 5 m/second. However, from the viewpoint of productivity, for example, the drawing rate v is selected from a range of about 10 to 50 m/second, the length L of the annealing furnace is selected from a range of about one to ten meters, and the slow cooling time t is one second or less.

<Rapid Cooling Process P4>

After the slow cooling process P3, the optical fiber is covered with a coating layer to enhance the resistance against external flaws, for example. Typically, this coating layer is formed of an ultraviolet curable resin. In order to form such a coating layer, it is necessary to sufficiently cool the optical fiber at a low temperature for preventing the coating layer from being burn, for example. The temperature of the optical fiber affects the viscosity of a resin to be applied, and as a result, this affects the thickness of the coating layer. A suitable temperature of the optical fiber in forming the coating layer is appropriately determined suitable for the properties of a resin forming the coating layer.

In the optical fiber production method according to one or more embodiments, the annealing furnace 121 is provided between the drawing furnace 110 and a coater 131 to decrease the section for sufficiently cooling the optical fiber. More specifically, the optical fiber production method according to one or more embodiments also includes the precooling process P2, further decreasing the section sufficiently cooling the optical fiber. Thus, the optical fiber production method according to one or more embodiments includes the rapid cooling process P4 in which the optical fiber delivered out of the annealing furnace 121 is rapidly cooled using a cooling device 122. In the rapid cooling process P4, the optical fiber is rapidly cooled faster than in the slow cooling process P3. Since the rapid cooling process P4 performed in this manner is provided the temperature of the optical fiber can be sufficiently decreased in a shorter section, easily forming the coating layer. The temperature of the optical fiber when it is delivered out of the cooling device 122 ranges from temperatures of 40° C. to 50° C., for example.

As described above, the optical fiber, which has been passed through the cooling device 122 and cooled to a predetermined temperature, is passed through the coater 131 containing an ultraviolet curable resin to be the coating layer that covers the optical fiber, and the optical fiber is covered with this ultraviolet curable resin. The optical fiber is further passed through an ultraviolet irradiator 132, ultraviolet rays are applied to the optical fiber, the coating layer is formed, and then the optical fiber 1 is formed. Note that, the coating layer is typically formed of two layers. In the case of forming a two-layer coating layer, after the optical fiber is covered with ultraviolet curable resins forming the respective layers, the ultraviolet curable resins are cured at one time, and then the two-layer coating layer can be formed. Alternatively, after forming a first coating layer, a second coating layer may be formed. The direction of the optical fiber 1 is changed by a turn pulley 141, and then the optical fiber 1 is wound on a reel 142.

As described above, one or more embodiments of the present invention are taken as examples. The present invention is not limited to these embodiments. That is, the optical fiber production method according to one or more embodiments of the present invention only has to include the drawing process and the slow cooling process described above. The precooling process and the rapid cooling process are not essential processes. The optical fiber production method according to one or more embodiments of the present invention is applicable to the production of any types of optical fibers. For example, the optical fiber production method according to one or more embodiments of the present invention is applicable also to production methods for optical fibers having different materials, such as chalcogenide glass and fluorine glass, as a principal component, as well as production methods for optical fibers having silica glass as a principal component, if the constant A and the activation energy $E_{act}$ in Equation (3) above are derived.

According to one or more embodiments of the present invention, there is provided a production method for an optical fiber with which an optical fiber with decreased transmission losses can be produced, and the method can be used in the field of optical fiber communications. The method can also be used for fiber laser devices and other devices using optical fibers.

REFERENCE SIGNS LIST

1 . . . optical fiber
1P . . . optical fiber preform
110 . . . drawing furnace
111 . . . heating unit
120 . . . tubular body
121 . . . annealing furnace
122 . . . cooling device
131 . . . coater
132 . . . ultraviolet irradiator
141 . . . turn pulley
142 . . . reel
P1 . . . drawing process
P2 . . . precooling process
P3 . . . slow cooling process
P4 . . . rapid cooling process Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical fiber production method comprising:
drawing an optical fiber from an optical fiber preform in a drawing furnace;
cooling the optical fiber in an annealing furnace;
delivering the optical fiber into the annealing furnace;
when the optical fiber is delivered into the annealing furnace, controlling a temperature difference between a temperature of the optical fiber and a fictive temperature of glass forming a core included in the optical fiber after a lapse of time from a certain point in time to be higher than 20° C. and lower than 100° C.; and
precooling the optical fiber to obtain the temperature difference prior to delivering the optical fiber into the annealing furnace.

2. The optical fiber production method according to claim 1, wherein
when the optical fiber is delivered into the annealing furnace, the temperature difference between the temperature of the optical fiber and the fictive temperature of glass forming the core is higher than 40° C. and lower than 60° C.

3. The optical fiber production method according to claim 1, further comprising:
controlling the temperature difference such that 20° C.$<T_f-T=(T_f^o-T) \exp(-\Delta t/\tau(T))<100°$ C., where the lapse of time is defined as $\Delta t$, a time constant of relaxation of a structure of glass forming the core is defined as $\tau(T)$, the temperature of the optical fiber at the certain point in time in a slow cooling process is defined as T, a fictive temperature of glass forming the core at the certain point in time is defined as $T_f^o$, and the fictive temperature of glass forming the core after the lapse of time $\Delta t$ from the certain point in time is defined as $T_f$.

4. The optical fiber production method according to claim 3, further comprising:
controlling the temperature difference such that 40° C.$<T_f-T=(T_f^o-T) \exp(-\Delta t/\tau(T))<60°$ C.

5. The optical fiber production method according to claim 1, wherein
the optical fiber stays in the annealing furnace in at least a time in a period in which a temperature of the optical fiber is in a range of 1,300° C. to 1,500° C., both inclusive.

6. The optical fiber production method according to claim 1, wherein
after a temperature T of the glass at which the fictive temperature of the glass can be most efficiently decreased is calculated using:

$$T = \frac{-\frac{E_{act}}{k_B} + \sqrt{\left(\frac{E_{act}}{k_B}\right)^2 + 4\frac{E_{act}}{k_B}T_f}}{2}$$

where $E_{act}$ is an activation energy, $k_B$ is Boltzmann constant, and $T_f$ is the fictive temperature of the glass, an upper limit and a lower limit of the temperature difference between the temperature of the optical fiber and the fictive temperature of the glass where a transmission loss of the optical fiber is not increased by 0.001 dB/km or more when the fictive temperature of the glass can be decreased are calculated using the temperature T, and
a temperature of the annealing furnace is set to control the temperature difference in a range of the upper limit to the lower limit in the cooling.

7. An optical fiber production method comprising:
drawing an optical fiber from an optical fiber preform in a drawing furnace;
cooling the optical fiber in an annealing furnace;
delivering the optical fiber into the annealing furnace; and
when the optical fiber is delivered into the annealing furnace, controlling a temperature difference between a temperature of the optical fiber and a fictive temperature of glass forming a core included in the optical fiber after a lapse of time from a certain point in time to be higher than 20° C. and lower than 100° C., wherein
after a temperature T of the glass at which the fictive temperature of the glass can be most efficiently decreased is calculated using $$T = \frac{-\frac{E_{act}}{k_B} + \sqrt{\left(\frac{E_{act}}{k_B}\right)^2 + 4\frac{E_{act}}{k_B}T_f}}{2}$$

where $E_{act}$ is an activation energy, $k_B$ is Boltzmann constant, and $T_f$ is the fictive temperature of the glass, an upper limit and a lower limit of the temperature difference between the temperature of the optical fiber and the fictive temperature of the glass where a transmission loss of the optical fiber is not increased by 0.001 dB/km or more when the fictive temperature of the glass can be decreased are calculated using the temperature T, and
a temperature of the annealing furnace is set to control the temperature difference in a range of the upper limit to the lower limit in the cooling.

8. The optical fiber production method according to claim 7, wherein
when the optical fiber is delivered into the annealing furnace, the temperature difference between the temperature of the optical fiber and the fictive temperature of glass forming the core is higher than 40° C. and lower than 60° C.

9. The optical fiber production method according to claim 7, further comprising:
controlling the temperature difference such that 20° C.$<T_f-T=(T_f^o-T)\exp(-\Delta t/\tau(T))<100°$ C., where the lapse of time is defined as $\Delta t$, a time constant of relaxation of a structure of glass forming the core is defined as $\tau(T)$, the temperature of the optical fiber at the certain point in time in a slow cooling process is defined as T, a fictive temperature of glass forming the core at the certain point in time is defined as $T_f^o$, and the fictive temperature of glass forming the core after the lapse of time $\Delta t$ from the certain point in time is defined as $T_f$.

10. The optical fiber production method according to claim 9, further comprising:
controlling the temperature difference such that 40° C.$<T_f-T=(T_f^o-T)\exp(-\Delta t/\tau(T))<60°$ C.

11. The optical fiber production method according to claim 7, wherein the optical fiber stays in the annealing furnace in at least a time in a period in which a temperature of the optical fiber is in a range of 1,300° C. to 1,500° C., both inclusive.

12. The optical fiber production method according to claim 7, further comprising:
precooling the optical fiber to obtain the temperature difference prior to delivering the optical fiber into the annealing furnace.

* * * * *